United States Patent [19]

Akimoto

[11] Patent Number: 5,787,233

[45] Date of Patent: Jul. 28, 1998

[54] ROUTE GENERATING DEVICE

[75] Inventor: Shinji Akimoto, Kamakura, Japan

[73] Assignee: Mitsubishi Denki Kabushiki Kaisha, Tokyo, Japan

[21] Appl. No.: 624,740

[22] Filed: Mar. 26, 1996

[30] Foreign Application Priority Data

Mar. 28, 1995 [JP] Japan ..................... 7-069660

[51] Int. Cl.$^6$ .......................... G06F 13/376; G06F 15/18
[52] U.S. Cl. .................. 395/10; 364/449.3; 395/81
[58] Field of Search .................. 364/449.3; 395/10, 395/81

[56] References Cited

U.S. PATENT DOCUMENTS

| | | | |
|---|---|---|---|
| 4,862,373 | 8/1989 | Meng | 364/444 |
| 4,940,925 | 7/1990 | Wand et al. | 318/587 |
| 5,335,181 | 8/1994 | McGuffin | 364/443 |
| 5,502,638 | 3/1996 | Takenaka | 364/424.02 |
| 5,504,841 | 4/1996 | Tani | 395/81 |

FOREIGN PATENT DOCUMENTS

| | | |
|---|---|---|
| 63-200207 | 8/1988 | Japan . |
| 4-278981 | 10/1992 | Japan . |

OTHER PUBLICATIONS

T. Siméon and B. Dacre-Wright, "A Practical Motion Planner for All-terrain Mobile Robots", Proc. IEEE Int'l Conf. on Intell. Robots and Syst., 1357–1363., Jul. 1993.

L. Fagegalter et al., "An aid to Multi-path Planning of All-Terrain Land Vehicles," Int'l. Conf. Syst., Man, and Cybernetics, vol. 2, pp. 300–305, Oct. 1993.

"3-D Autonomous Navigation in a Natural Environment" F. Fawzi, et al., IEEE Int'l Conf. Robotics and Automation, vol. 1, pp. 433–439, May 1994.

M. Cherif, et al., "Planning the Motions of an All-Terrain Vehicle by Using Geometric and Physical Model," IEEE Int'l Conf. Robotics and Automation, 2050–2056, May 1994.

M. Cherif, et al., "Dealing with Vehicle/Terrain Interactions when Planning the Motions of a Rover", Int'. Conf. Intell. Robots and Systems, vol. 1, 579–586, Sep. 1994.

E. Krotkov and R. Hoffman "Terrain Mapping for a Walking Planetary Rover," IEEE Trans. on Robotics and Automation, vol. 10 (6), pp. 728–739, Dec. 1994.

M. Suzuki, et al., "Geographical Route Planning Based on Uncertain Knowledge" Int'l. Conf. Tools w/ Artificial Intelligence, 434–441, Nov. 1995.

Primary Examiner—Robert W. Downs
Attorney, Agent, or Firm—Wolf, Greenfield & Sacks, P.C.

[57] ABSTRACT

A route generating device has an elevation map memory storing elevation data for subareas defined by division of an operations zone. A gradient map creating section calculates gradient data based on the elevation data and creates a gradient map from the gradient data. An obstruction region extracting section extracts an inclination obstruction region based on the gradient map. A traveling route generating section obtains a travelable region based on the inclination obstruction region. All possible traveling routes is calculated based on the travelable region. A route evaluating section evaluates the traveling routes and selects an optimum route from the current position to the destination. The gradient map is created based on the elevation data, it is possible to generate an optimum route without three dimensional obstruct such as a fall, a tumble and any other inability in movement of the movable object.

8 Claims, 19 Drawing Sheets

..... ARC OF ROAD
• NODE OF ROAD
⋈ NODES AND ARC OF BRIDGE

— NEW ARC CONNECTED IN THIS PROCESS
○ NEW NODE CONNECTED IN THIS PROCESS

— EXAMPLE OF OPTIMUM ROUTE

- ELEVATION POINT STORED
- GRADIENT POINT STORED

1

ROUTE GENERATING DEVICE

BACKGROUND OF THE INVENTION

1. Field of the Invention:

This invention relates to a route generating device for outputting an optimum traveling route of a movable object.

2. Description of the Related Art:

Route generating devices which generate a traveling route of a movable object are well-known in the art. An example is an automatic robot which generates a traveling route from a current position to a destination on the basis of map information over an operations zone. The conventional device generates a traveling route by using an obstruction map memory which stores position data of an obstruction region where the movable object cannot keep traveling. The route leads the movable object to advance around obstructions.

Since the conventional device generates a traveling route by using position information of obstructions only in planar field, it cannot cope with an obstruct resulting from three-dimensional ups and downs, such as a fall, a tumble, and other inability in movement of a movable object.

When a route generating device is used in an outdoor environment which includes various kinds of natural obstructions, such as rivers, lakes and woods, and artificial structures, such as a road, a bridge and a tunnel, it is necessary to discriminate the natural obstructions and the artificial structures in generating a traveling route. The conventional device, however, has no means for discriminating and processing such information and can therefore create only an ineffective traveling route.

SUMMARY OF THE INVENTION

A first object of this invention is to provide a route generating device capable of generating a traveling route while preventing obstructs such as a fall, a tumble and any other inability in movement in a field having threedimensional ups and downs.

A second object of the invention is to provide a route generating device capable of generating a traveling route considering various natural obstructions in the outdoors and avoiding obstructions by using artificial structures such as a road, a bridge and a tunnel.

According to a first aspect of the invention, there is provided a route generating device comprising: an elevation map memory storing elevation data of subareas which are defined by division of an operations zone of a movable object; an input unit reading the elevation data from the elevation map memory; a gradient map creating section calculating gradient data based on the elevation data read from the map memory so as to create a gradient map; an obstruction region extracting section extracting an inclinational obstruction region on the basis of the gradient map, said inclinational obstruction region having a gradient enough to hinder a movement of the movable object; a route generating section determining a travelable region on the basis of the inclinational obstruction region for going around obstructions so as to calculate possible traveling routes on the basis of the travelable region for avoiding the obstructions; a route evaluating section evaluating the traveling routes calculated in the route generating section so as to select an optimum route from a current location of the movable object to a destination; and an output unit outputting the optimum route selected in the route evaluating section.

With the above arrangement, the gradient map can be created on the basis of the elevation data so that a subarea can be extracted to have a gradient large enough to hinder a movement of the movable object. As a result, when the movable object is operated in the operations zone having three-dimensional ups and downs, the traveling route can be derived for the movable object to avoid a fall, a tumble and any other inability in movement of the movable object.

According to a second aspect of the invention, there is provided a route generating device according to the first aspect further comprising a natural obstructions map memory storing position data of a natural obstruction region occupied by a natural obstruction to the movable object, and a region composite section superposing the inclinational obstruction region and the natural obstruction region so as to create a composite obstruction region, said route generating section determining said travelable region on the basis of the composite obstruction region.

With the above arrangement, the traveling route can be derived to avoid the natural obstruction region such as a river and woods in which the movable object is hard to move.

According to a third aspect of the invention, there is provided a route generating device according to the second aspect further comprising an artificial structures map memory storing position data of an artificial structure which the movable object can use, wherein said route generating section is capable of superposing said travelable region and said artificial structure so as to calculate the possible traveling route through the artificial structure.

With the above arrangement, the traveling route can be derived to utilize the artificial structure such as a bridge and a tunnel, thereby providing a more reliable traveling route. Although there can be a chance of the traveling route not to reach the destination by simply avoiding the natural obstruction and the inclinational obstruction, the utilization of the artificial structure improve the reliability of reaching the destination.

According to the fourth aspect of the invention, there is provided a route generating device according to the first aspect wherein said elevation map memory stores an elevation of a southwestern end of said subarea as said elevation data, said gradient map creating section being capable of calculating a gradient of said subarea to an eastern, a northern and a northeastern subareas.

With the above arrangement, the calculation can be effected only on the gradients in three directions, so that it is possible to improve the rate of the calculation process.

According to a fifth aspect of the invention, there is provided a route generating device according to the first aspect wherein said obstruction region extracting section is capable of interpolating the gradients of adjacent ones of said subareas in terms of a straight line and of extracting as said inclinational obstruction region a subarea which is related to the gradient over a maximum movable gradient.

With the above arrangement, a continuous inclinational obstruction region can be extracted so that it is possible to minimize a gradient error due to the non-continuous variation of the subareas.

According to a sixth aspect of the invention, there is provided a route generating device according to the first aspect wherein said route evaluating section is capable of calculating an arc length as an index of a shortest traveling route and an arc gradient as an index of a degree of difficulty in a movement, and weighting said arc length and said arc gradient so as to select the optimum route.

With the above arrangement, a shorter route with a smooth traveling can be selected as the optimum route depending upon the weighting.

According to a seventh aspect of the invention, there is provided a route generating device according to the first aspect wherein said route evaluating section is capable of calculating an arc length as an index of a shortest traveling route and a vertical variation between opposite arc ends as an index of ups and downs of the traveling route, and weighting said arc length and said vertical variation so as to select the optimum route.

With the above arrangement, a shorter route with less ups and downs can be selected as the optimum route with a cost effectiveness depending upon the weighting.

According to an eighth aspect of the invention, there is provided a route generating device according to the first aspect wherein said route evaluating section is capable of calculating an arc length as an index of a shortest traveling route, an arc gradient as an index of a degree of difficulty in a movement and a vertical variation between opposite arc ends as an index of ups and downs of the traveling route, and weighting said arc length, said arc gradient and said vertical variation so as to select the optimum route.

With the above arrangement, a shorter route with a smooth traveling and less ups and downs can be selected as the optimum route with a cost effectiveness depending upon the weighting.

The above and other objects, features and advantages will become apparent from various preferred embodiments described in conjunction with the accompanying drawings.

DETAILED DESCRIPTION OF THE PREFERRED EMBODIMENTS

Figure 1:
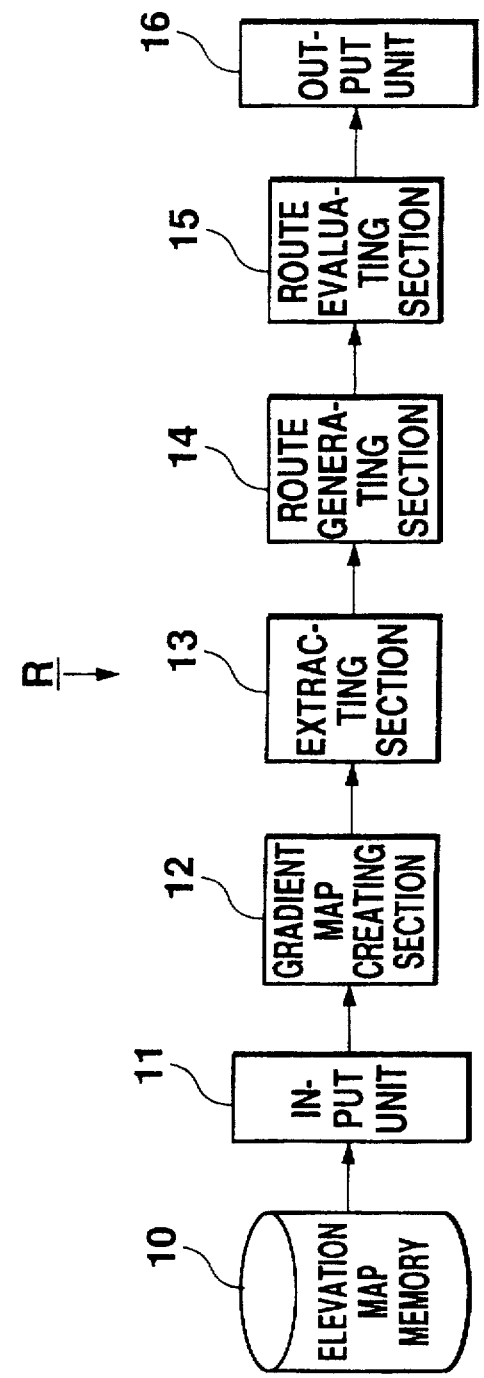
FIG. 1 is a block diagram showing a route generating device according to a first embodiment of the invention.

FIG. 1 shows an entire structure of a route generating device according to a first embodiment of the invention. The route generating device R has an elevation map memory 10 for storing elevation data over an operations zone of a movable object. An input unit 11 reads out the elevation data from the elevation map memory 10 so as to supply the data to a gradient map creating section 12. The gradient map creating section 12 calculates gradient data on the basis of the supplied elevation data so as to create a gradient map. An obstruction region extracting section 13 extracts, based on the created gradient map, an inclinational obstruction region having a gradient large enough to hinder the movement of the movable object. A route generating section 14 obtains, based on the extracted inclinational obstruction region, a travelable region for the movable object to go around the obstruction and calculates all of possible traveling routes on the basis of the obtained travelable region for avoiding the obstruction. A route evaluating section 15 evaluates the calculated traveling routes according to a predetermined index so as to select the optimum route from the current location to the destination. The selected optimum route is outputted from an output unit 16.

Figures 2, 3:
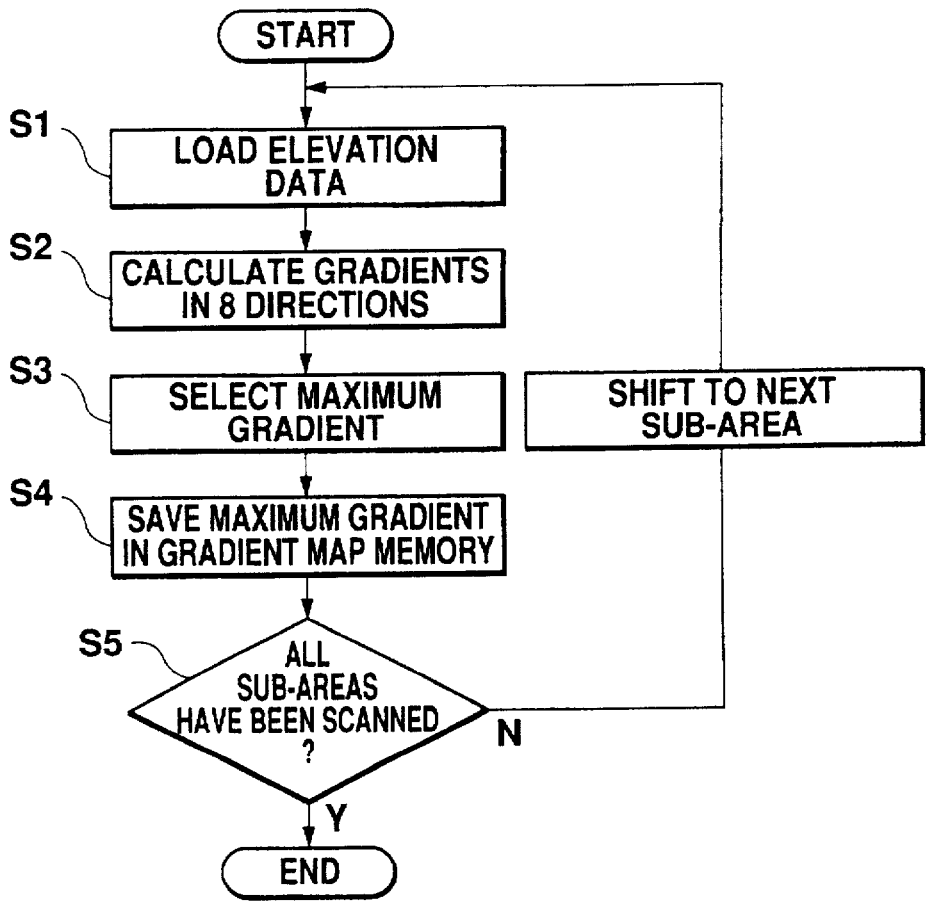
FIG. 2 illustrates a data structure of the elevation map memory.
FIG. 3 is a flow chart illustrating the process in the gradient map creating section.

The elevation map memory 10 stores elevation data for each of subareas which are defined by division of the operations zone through a lattice along the longitude and latitude. Each subarea is, as shown in FIG. 2, labeled with the X coordinate i=0, 1, . . . , n extending north from the southwestern corner of the operations zone and with the Y coordinate j=0, 1, . . . , m extending east from the southwestern corner. Accordingly, the elevation data is stored as $h(i, j)$ in the elevation map memory 10. The elevation data comprises an elevation value at the southwestern corner of the respective subareas.

Figures 4, 5:
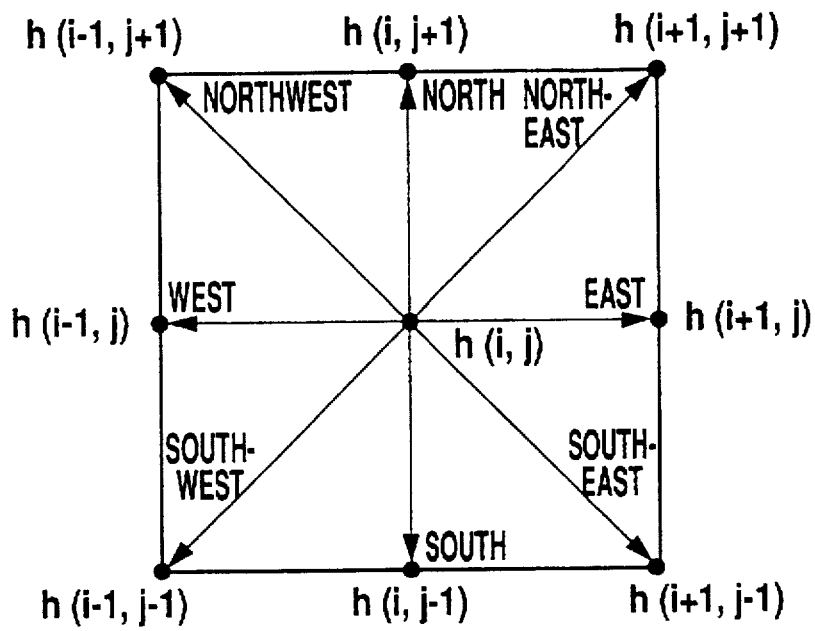
FIG. 4 illustrates positions of subareas in eight directions for calculating the gradients.
FIG. 5 illustrates a data structure of gradient map data.

The gradient map creating section 12, as shown in FIG. 3, processes the elevation data so as to create a gradient map. The gradient map creating section 12 loads at the first step Si the elevation data $h(i, j)$ of a single subarea along with the elevation data $h(i-1, j+1)$, $h(i-1, j)$, $h(i-1, j-1)$, $j(i, j+1)$, $h(i, j-1)$, $h(i+1, j+1)$, $h(i+1, j)$, $h(i+1, j-1)$ of the respective subareas in eight directions surrounding the single subarea (see also FIG. 4). Elevation differences are calculated between the central subarea and the respective subareas in the eight directions at the second step S2. The obtained elevation differences are then divided by the corresponding distances between the subareas so as to obtain gradient values in the eight directions. It should be noted that the calculation cannot be made in all of the eight directions when a subarea next to the map frame is positioned in a central location. The largest gradient value is, at the third step S3, selected from the calculated values in the eight directions as the maximum gradient $d(i,j)$, which is saved as gradient map data at the fourth step S4. If the gradient map creating section 12 judges, at the fifth step S5, that the gradient map data is not saved for all of the subareas, the next subarea is selected and the processing returns to the first step Si. The first to fifth steps S1–S5 are repeated until gradient map data for all of the subareas are saved. Thus the gradient map shown in FIG. 5 can be created.

Figure 6:
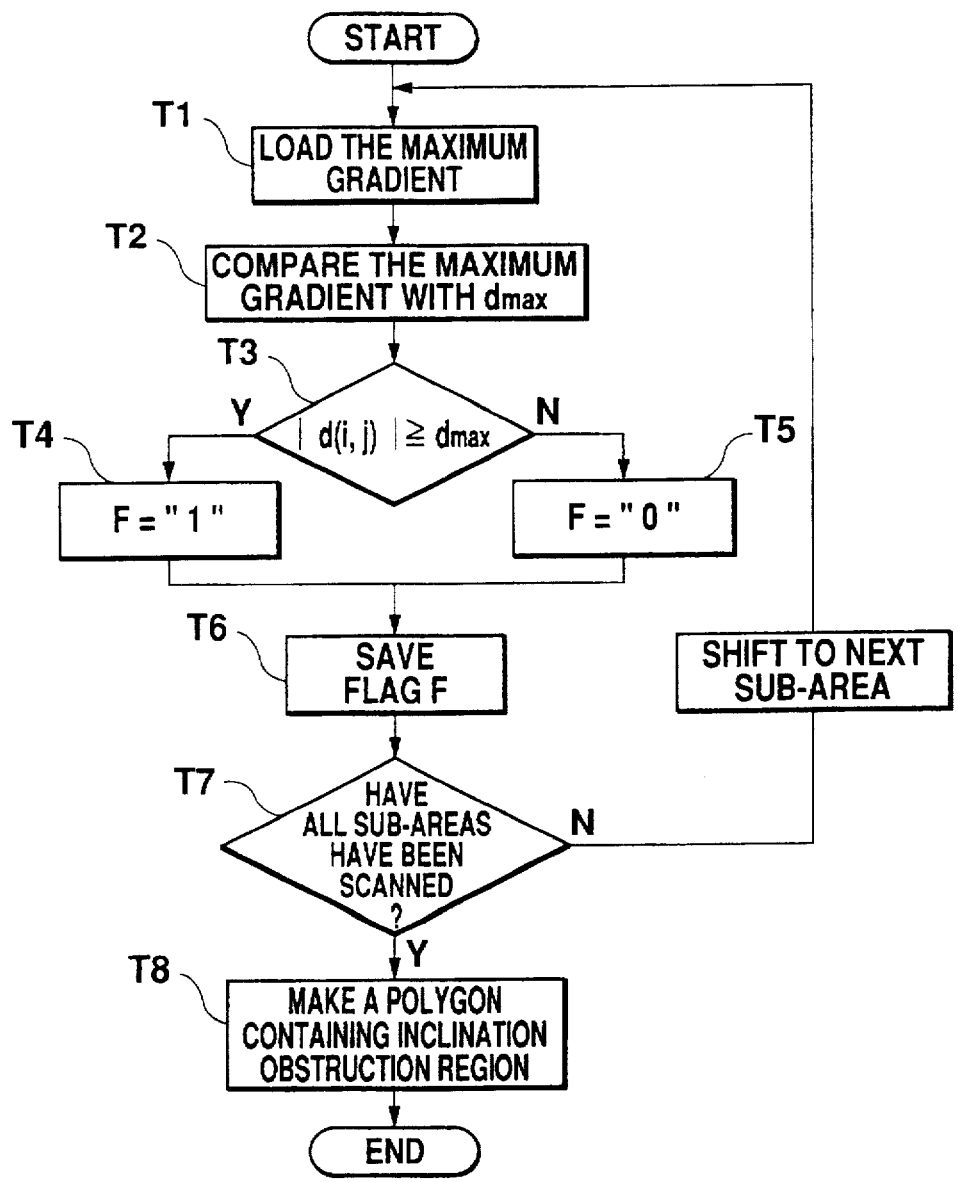
FIG. 6 is a flow chart illustrating the process in the obstruction region extracting section.
Figure 7:
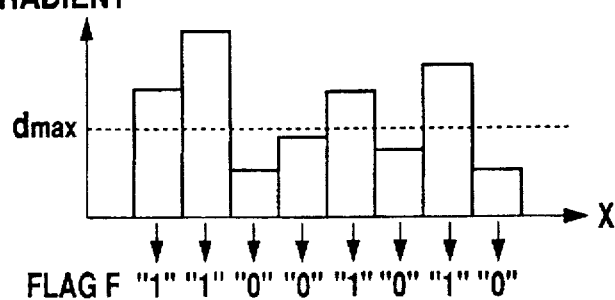
FIG. 7 illustrates the extraction of the inclinational obstruction region.
Figure 8:
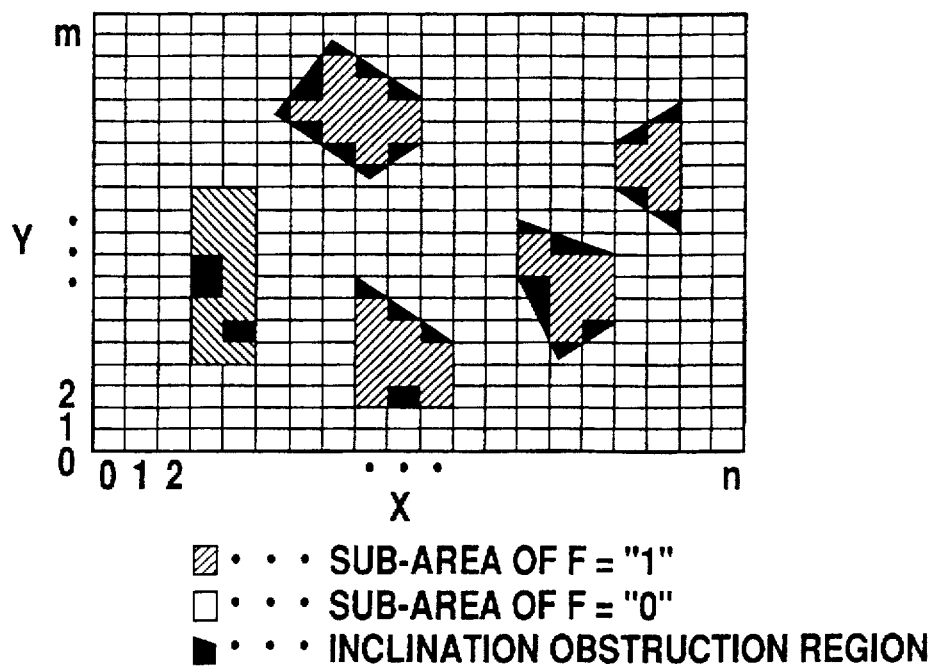
FIG. 8 is an inclinational obstruction map showing the extracted inclinational obstruction regions.

The obstruction region extracting section 13, as shown in FIG. 6, processes the gradient data so as to extract inclinational obstruction regions. The obstruction region extracting section 13 loads, at the first step Ti, the maximum gradient $d(i,j)$ stored in the gradient map for the respective subareas. The absolute value of the maximum gradient $d(i,j)$ is, at the second step T2, compared with a predetermined maximum movable gradient (dmax) of the movable object. If the obstruction region extracting section 13 judges at the third step T3 that the absolute value is equal to or larger than the maximum movable gradient (dmax), a flag "F=1" is established at the fourth step T4. On the contrary, if the absolute value is judged to be smaller than the maximum movable gradient (dmax), a flag "F=0" is established at the fifth step T5. The flag F is saved at its corresponding coordinate position at the sixth step T6. If a judgment is made, at the seventh step T7, that the process for all of the subareas has not yet been completed, the next subarea is selected, and then the processes of the first through seventh steps TI–T7 are repeated. FIG. 7 shows the change of flags, namely, the result of comparisons for the maximum gradients of subareas extending along for example the x-axis. FIG. 8 shows an inclinational obstruction map representing the final result of comparisons. The subareas classified in F=1 are shaded while the subareas classified in F=0 is left in blank. This inclinational obstruction map includes polygons each completely containing a mass of the subareas of F=1. The sides of the polygon and all regions inside the polygon except the subareas of F=1 are filled with black color. The obstruction region extracting section 13 lists, on the basis of the inclinational obstruction map, positions of the individual apices of the inclinational obstruction region and a relationship of the apices constituting each of the sides of the polygon. The obtained list is fed to the route generating section 14.

Figure 9:
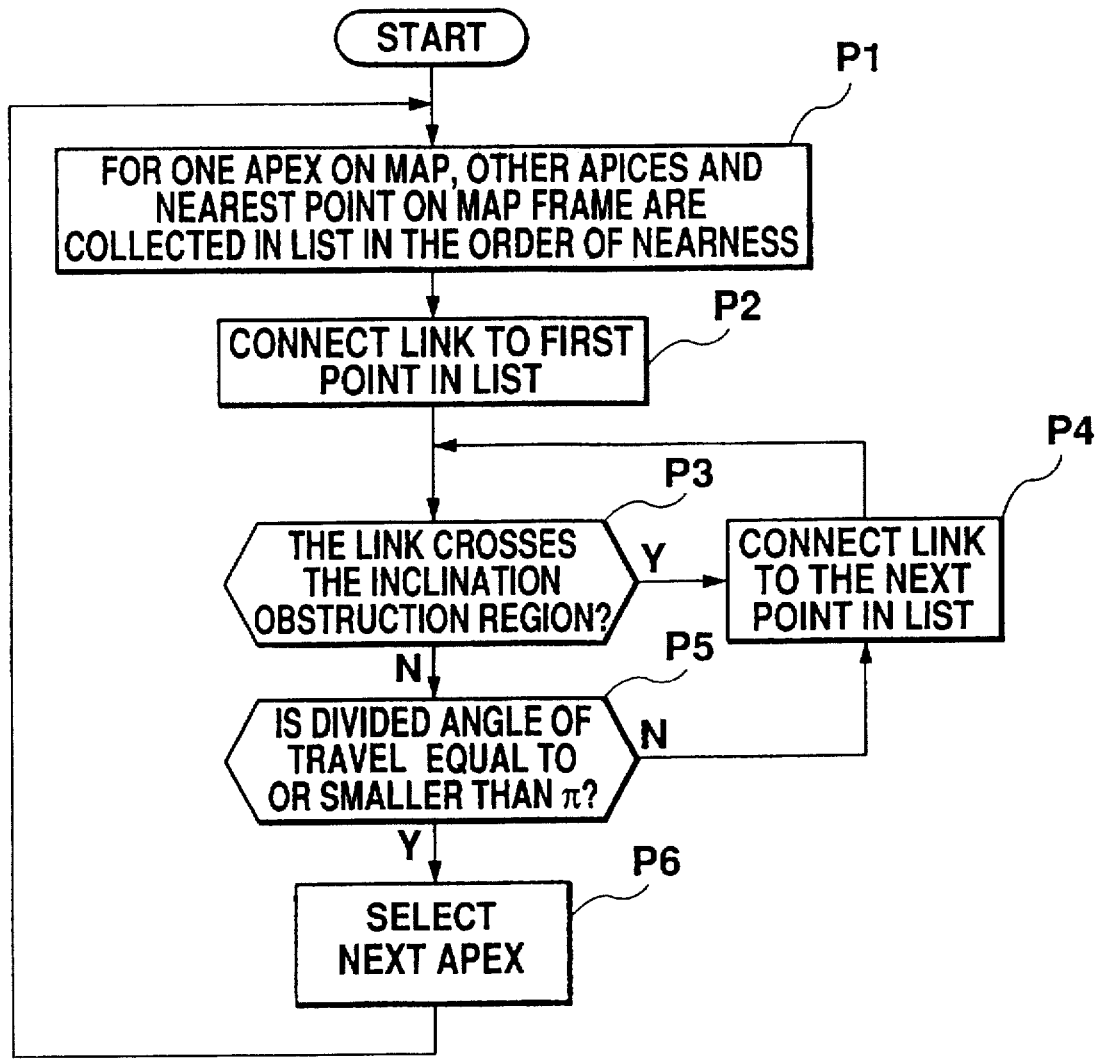
FIG. 9 is a flow chart illustrating the process in the route generating section.

The route generating section 14 processes the travelable regions which are left in blank in the inclinational obstruction map of FIG. 8 so as to calculate traveling routes. The calculation of traveling routes utilizes the approach, for example shown in FIG. 9, proposed in an article entitled "Safe Region Structuring Technique and High-Speed Routing Algorithm For Autonomic Robot"(a pre-distributed collection of articles for The 8th Scientific Lecture Meeting of Japan Robot Society). More specifically, one apex of a single inclinational obstruction region is selected as a starting point at the first step P1. The route generating section 14 calculates a distance between the starting point and the another apex point (located within or without the same inclinational obstruction region or another inclinational obstruction region) and a distance between the starting point and a shortest point on the map frame. The apices are listed in order from the shortest one to the starting point on the basis of the obtained distances. It should be noted that the "shortest point" on the map frame is defined as a point which lies on both of the map frame and a perpendicular from the starting point toward the map frame and which is related to the shortest perpendicular.

The individual apices are subsequently connected at the second step P2 with the starting point by links successively in order of the list. If a judgment is made at the third step P3 that a link crosses the inclinational obstruction region, such a link is aborted. The next apex in the list is instead connected with the starting point by another link. The process of the third and fourth steps P3, P4 are repeated until any link is found passing no inclinational obstruction region.

Figure 10A:
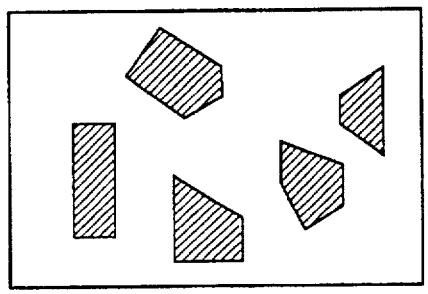
FIGS. 10A–10D illustrate the process of generating the optimum route.
Figure 10B:
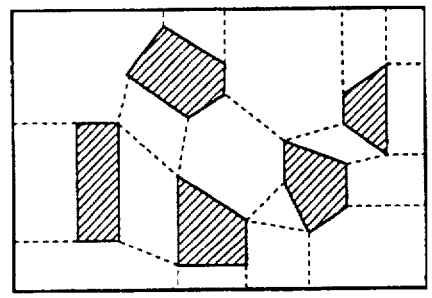
Figure 10C:
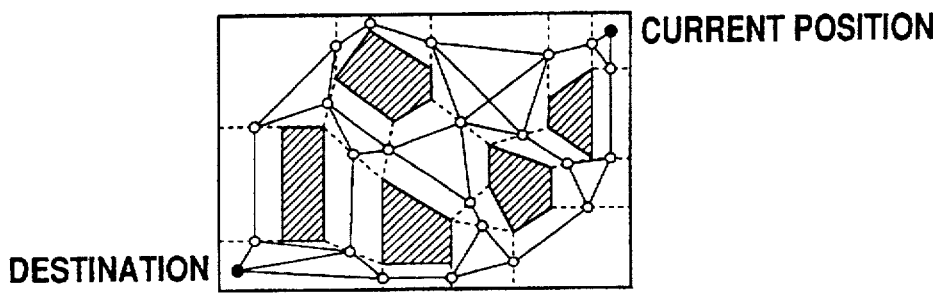

When the first link is found to pass no inclinational obstruction region, the processing advances to the fifth step P5. Divided angles, defined by a link dividing the travelable region, are calculated at the fifth step P5. If the divided angle is larger than $\pi$, the processing returns to the fourth step P4 to repeat the division. A link is connected to the next apex in the list. On the contrary, if it is judged that the divided angle is equal to or smaller than $\pi$, the connection from the starting point is completed. The processing advances to the sixth step P6 where the next apex is selected as a new starting point so as to repeat the processes of the first through sixth steps P1–P6. The completion of the process for all of the apices leads to the division of the travelable region of FIG. 10A into a plurality of subdivisions by a number of links indicated by dotted lines as shown in FIG. 10B. Midpoints or middle nodes of the respective links are calculated as transit points of the traveling routes. All of the nodes within the common subdivision are interconnected by arcs. The current position and the destination are previously introduced into the inclinational obstruction map as new nodes. The new nodes are connected by arcs to the nodes within the respective subdivisions containing the current position and the destination as shown in FIG. 10C.

Figure 10D:
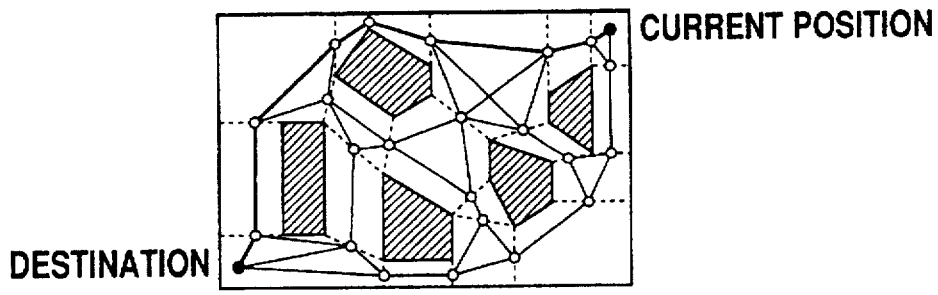

The route evaluating section 15 determines all combinations of the arcs which satisfy traveling routes from the current position to the destination. The individual traveling routes include nodes to be passed and listed. The list is evaluated based on a predetermined route index. Complying a traveling route best with the route index leads the selection of an optimum route. Assuming that "shortest route" is given as a route index, a traveling route follows every arc from the current position through every node, which arc has the arc length $r$ to be added one after another. The sum of the arc lengths defines the total distances D1, D2, ...., Dn for the respective traveling route, from the current position to the destination. The shortest route is, as shown by a bold line in FIG. 10D, selected as the optimum route from the calculated total distances.

The output unit 16 edits the positions of the successive nodes in order of passage for the optimum route provided from the route evaluating section 15, then outputs the edited positions.

Figure 11:
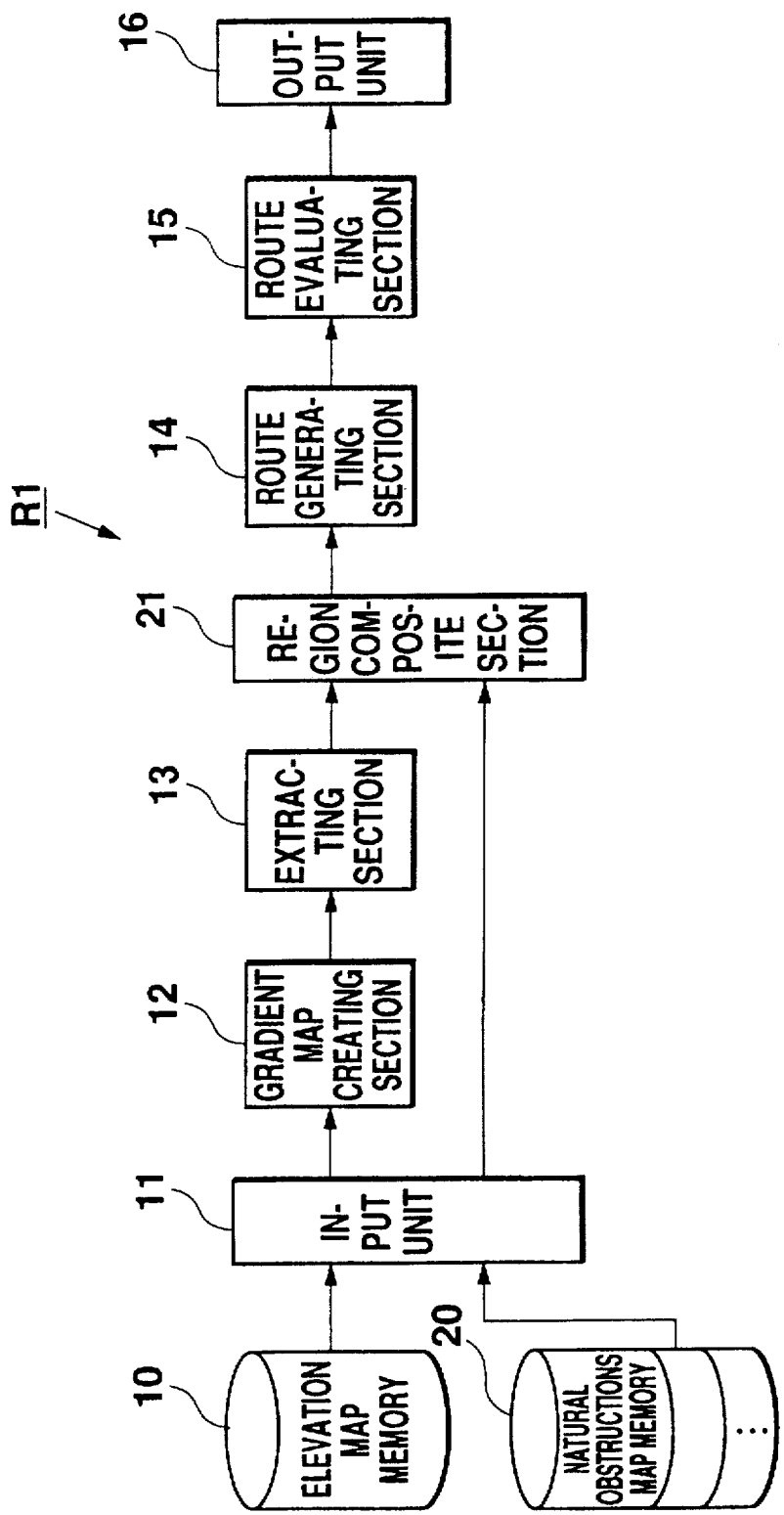
FIG. 11 is a block diagram showing a route generating device according to a second embodiment of the invention.

FIG. 11 shows an entire structure of a route generating device according to a second embodiment of the invention. The route generating device R1 of the second embodiment includes, in addition to the components of the first embodiment, a natural obstructions map memory 20 storing position data of a natural obstruction occupied by a natural obstruction to the movable object, and a region composite section 21 superposing the inclinational obstruction region and the natural obstruction region so as to create a composite obstruction region. The route generating section determines the travelable region on the basis of the composite obstruction region. It should be noted that the same components as the above-described first embodiment are identified by like reference characters so that the detailed description thereof can be omitted.

Figure 12A:
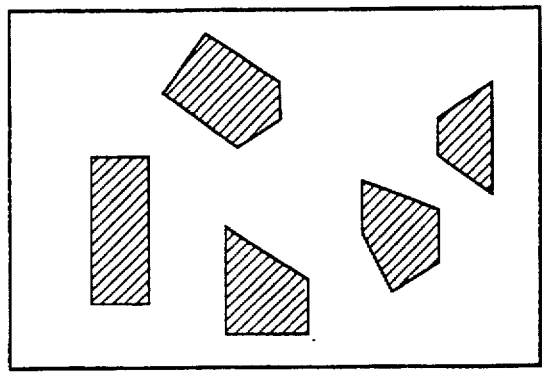
FIGS. 12A–12C illustrate various obstruction regions before the composite process.
Figure 12B:
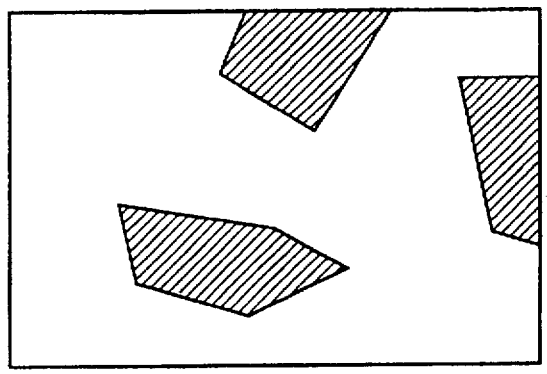
Figure 12C:
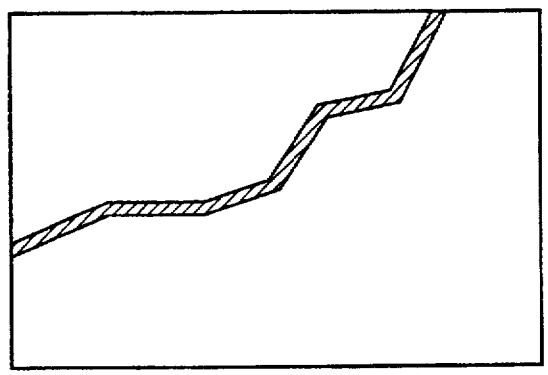

The natural obstructions map memory 20 stores a woods obstruction region representing a woods region hindering a movement of the movable object, and a river obstruction region representing a river region hindering a movement of the movable object. The woods obstruction region (see FIG. 12B) and the river obstruction region (see FIG. 12C) are stored in the natural obstructions map memory 20 by making a polygon containing the existing region. The natural obstructions map memory 20 maintains as the position data the individual apices of each polygon and a relationship between apices constituting the individual sides of each polygon. The input unit 11 reads out the position data.

Figure 13:
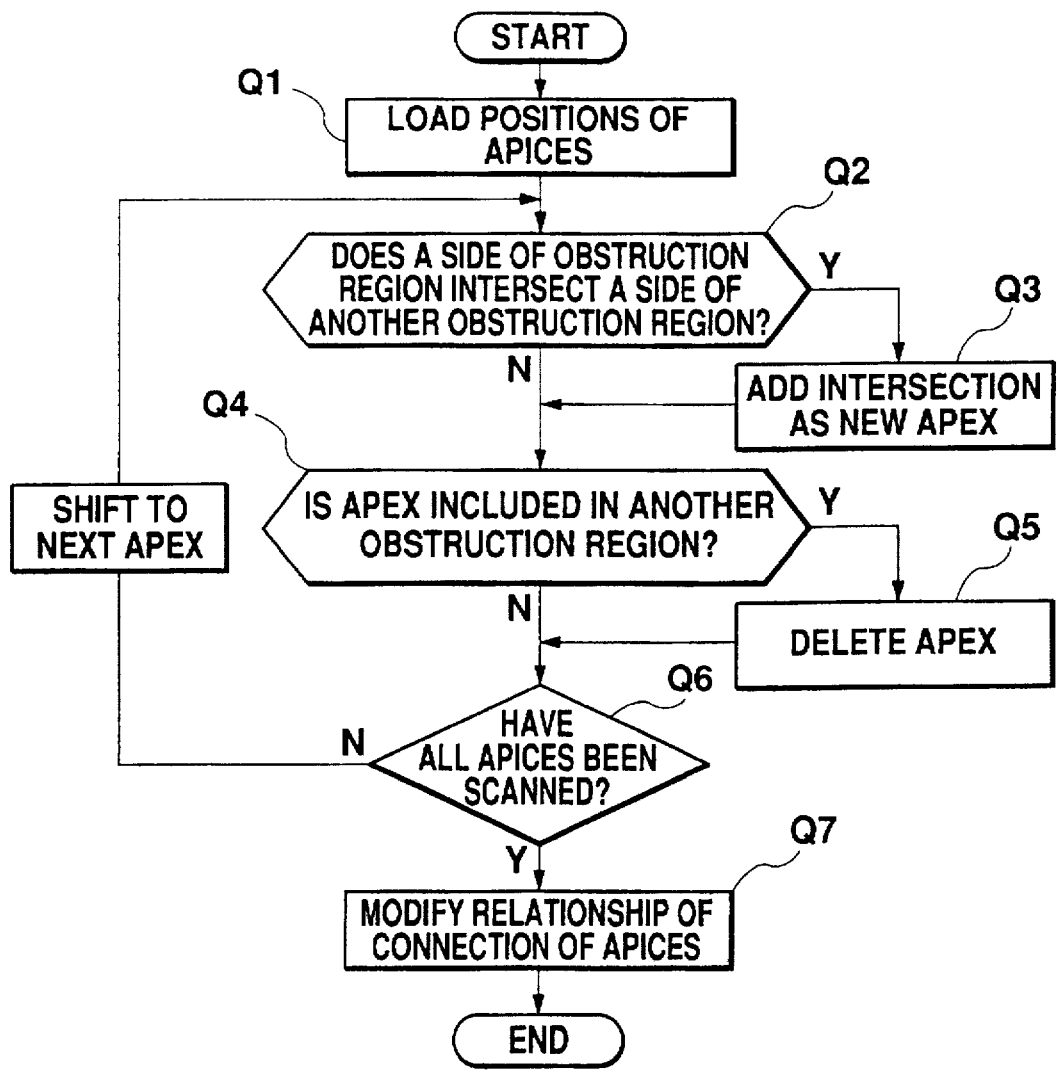
FIG. 13 is a flow chart illustrating the process in the region composite section.
Figure 14:
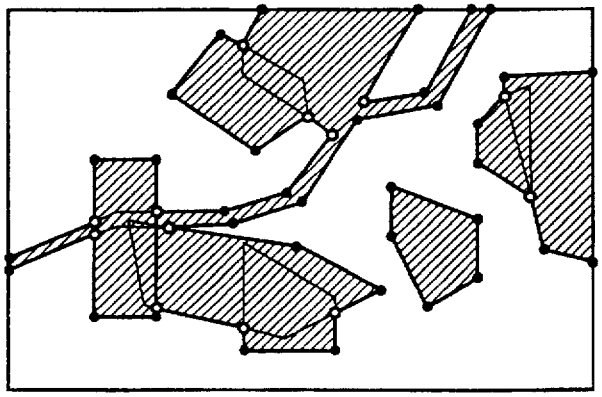
FIG. 14 is an obstruction map showing a composite obstruction region.

The region composite section 21 composites, as shown in FIG. 13, the inclinational obstruction region (see FIG. 12A), the woods obstruction region and the river obstruction region so as to create a composite obstruction region. The region composite section 21 loads, at the first step Q1, the position of the respective apices of the respective obstruction regions and the relationship thereof so as to create a list of position data. A discrimination is made, at the second step Q2 whether or not the sides of the obstruction regions intersects any side of another obstruction regions. For instance, an apex of the inclinational obstruction region is selected as a starting point. The region composite section 21 thereafter considers whether or not the sides extending from the starting point intersects any side of another kinds of obstruction region. If it is judged that the side intersects another one, the processing advances to the third step Q3 in which the intersect point of the two sides is introduced in the list as a new apex. It is judged at the fourth step Q4 whether or not the starting point is contained in another obstruction region. When the starting point is contained within the another region, the starting point is deleted from the list at the fifth step Q5. If it is judged at the sixth step Q6 that all apices have not yet been subjected to the process, the processes of the second through fifth steps Q2–Q5 are repeated, with the next apex set as the starting point. If it is judged at the sixth step Q6 that all apices has been completely subjected to the process, the relationship of the apices is modified at the seventh step Q7 so as to construct a closed periphery of the obstruction region, thereby updating the list according to the modification. A map containing the composite obstruction region is created as shown in FIG. 14, in which black points represent apices prior to the composite process, thin lines represent sides prior to the composite process, blank points represent the new apices, and shaded regions represent composite obstruction regions.

Figure 15:
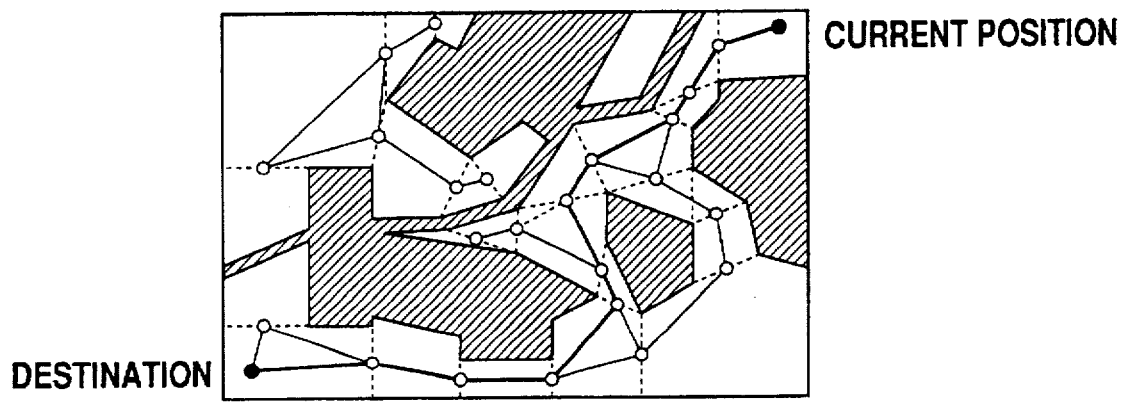
FIG. 15 illustrates an optimum route selected on the basis of the obstruction map.

The route generating section 14 performs the same process as in the first embodiment, based on the composite obstruction region created in the region composite section 21. An inclinational obstruction map is thus created as shown in FIG. 15. According to the second embodiment, a traveling route can be obtained to go around not only inclinational obstructions but also natural obstructions, such as woods and rivers, hindering a movement of the movable object.

Figure 16:
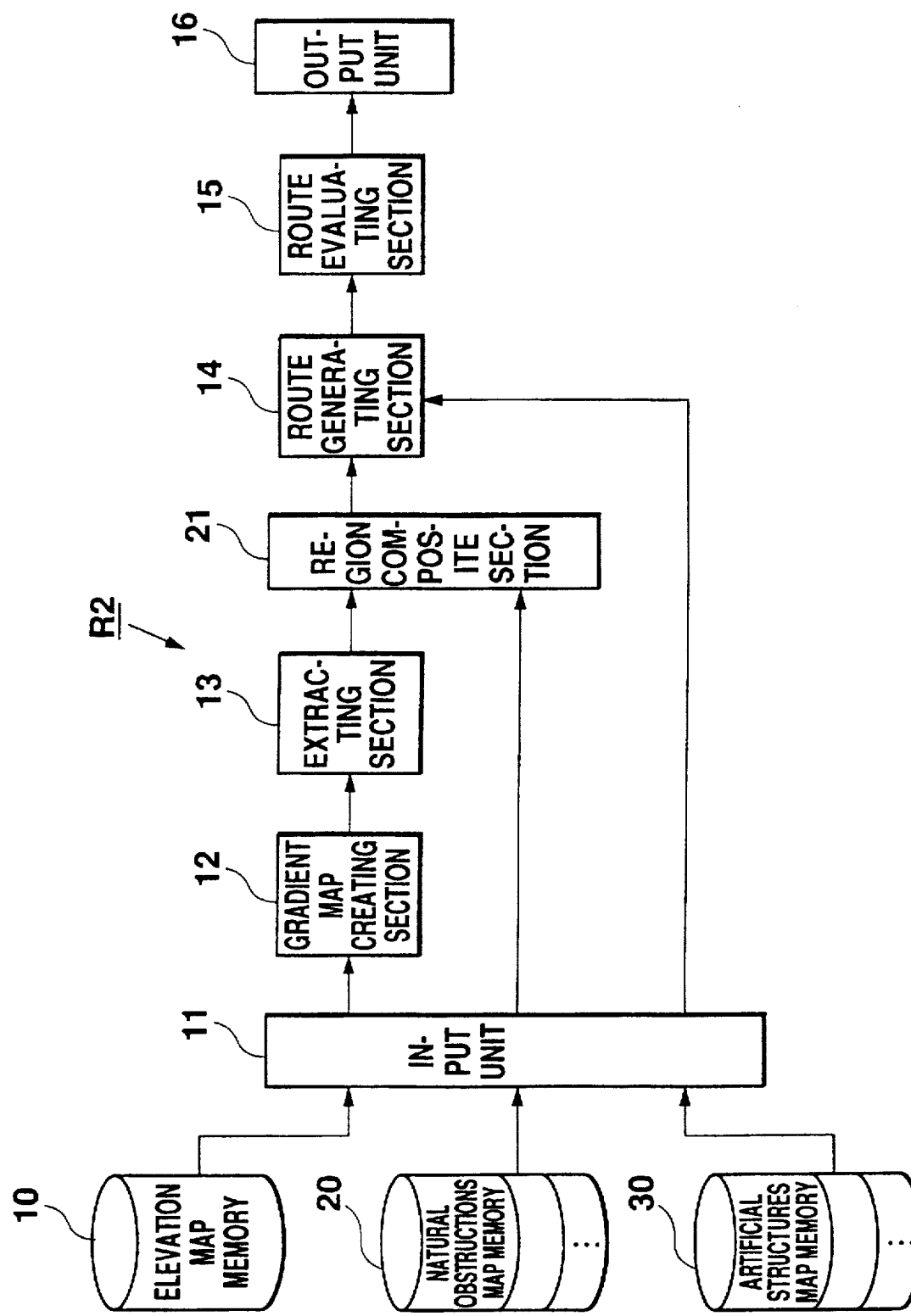
FIG. 16 is a block diagram showing a route generating device according to a third embodiment of the invention.

FIG. 16 shows an entire structure of a route generating device according to a third embodiment of the invention. The route generating device R2 of the third embodiment includes, in addition to the components of the above-described second embodiment, an artificial structures map memory 30 storing position data of artificial structures which the movable object can use. The route creating section 14 superposes the travelable region and the artificial structures so as to calculate traveling routes through the artificial structures. It should be noted that the same components as the abovedescribed first and second embodiments are identified by like reference characters so that the detailed description thereof can be omitted.

The artificial structures map memory 30 stores road data and bridge data. The road data includes position data regarding the individual apices of routes approximated by a combination of straight lines and the relationship of the apices, elevation data of the apices and the attribute data regarding road width and paved/unpaved. The bridge data includes position data of opposite ends of a bridge, elevation data, and attribute data regarding width and load limit. The input unit 11 reads out these data so as to supply to the route generating section 14.

Figure 17:
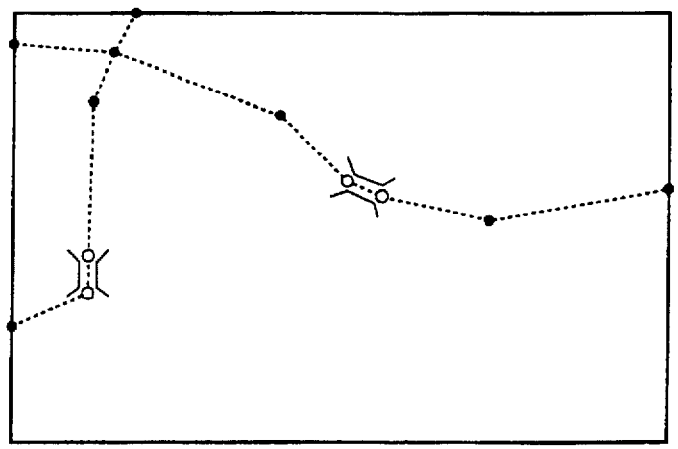
FIG. 17 illustrates nodes and arcs of artificial structures.

The route generating section 14 calculates nodes and arcs through the above-mentioned process on the basis of the composite obstruction region created by the region composite section 21. Position data of the calculated nodes and arcs are loaded to create a list. These nodes and arcs are referred to as "existing nodes" and "existing arcs". The position data read by the input unit 11 is introduced into the list as new nodes. The attribute data read by the input unit 11 is introduced into the list as attribute data of each arc. These new nodes and arcs are referred to as "new nodes" and "new arcs". Black points in FIG. 17 represent nodes corresponding a connection between the straight lines of the traveling route, blank points represent nodes corresponding opposite ends of a bridge, and dotted lines represent arcs of roads and bridges.

Figure 18:
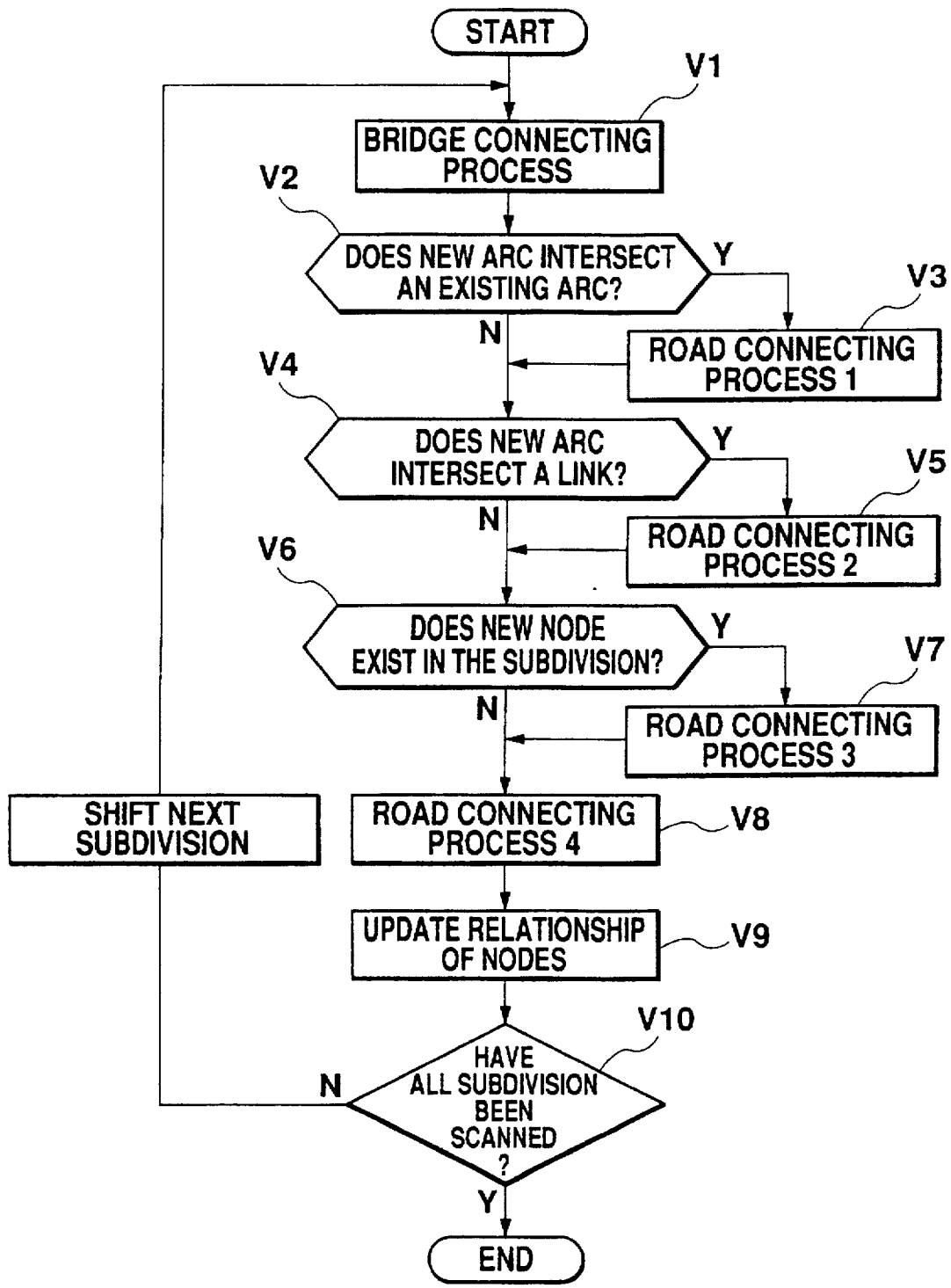
FIG. 18 is a flow chart illustrating the process in the route generating section.
Figure 19A:
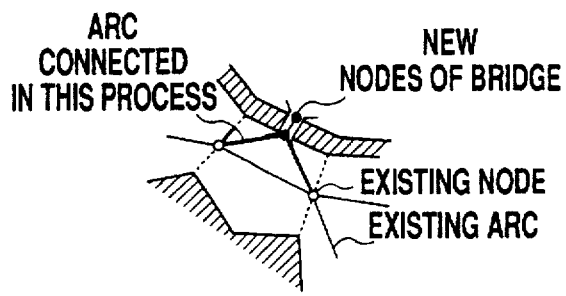
FIGS. 19A–19E illustrate the process of creating arcs.
Figure 19B:
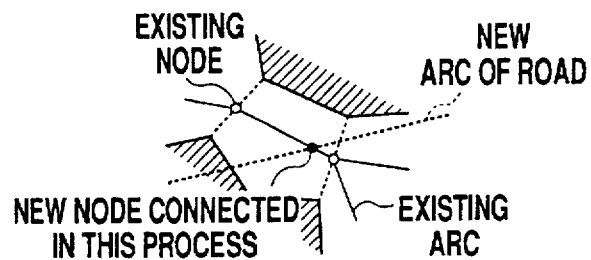
Figure 19C:
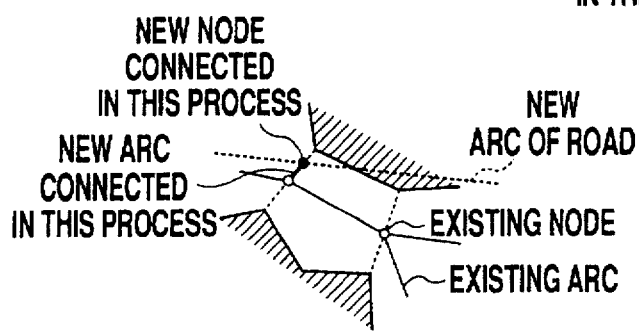
Figure 19D:
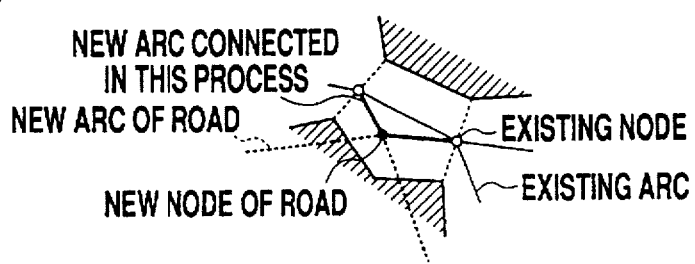
Figure 19E:
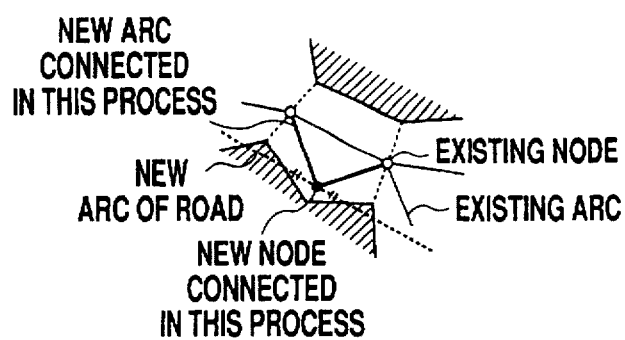
Figure 20:
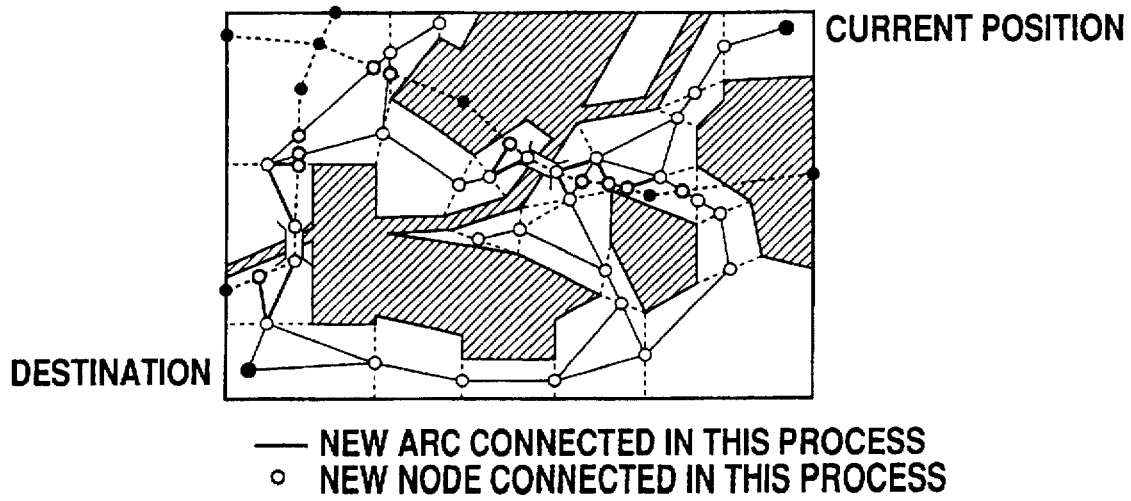
FIG. 20 is an obstruction map showing artificial structures and composite obstruction regions.

The route generating section 14 creates a traveling routes according to the process shown in FIG. 18. Bridges are introduced at the first step V1 into the inclination obstruction map created by the region composite section 21. The nodes at opposite ends of a bridge are interconnected, as shown in FIG. 19A, so as to form an arc between all of the existing nodes and the nodes of the bridge within the subdivision contiguous to the nodes of the bridge. It is judged at the second step V2 whether or not there exists any intersection between a new arc and an existing arc. If an intersection exists, the processing advances to a third step V3 in which the intersection is introduced into the list as a new node in a road connecting process 1 as shown in FIG. 19B. If it is judged at the second step V2 that no intersection exists or if the process of the third step V3 is completed, the processing advances to the fourth step V4 in which it is judged whether or not a new arc intersects a link. If an intersection exists, the processing advances to the fifth step V5 in which the intersection is introduced into the list as a new node in a road connecting process 2 as shown in FIG. 19C. The new node is connected to the existing node on the same link by an arc. If it is judged at the fourth step V4 that no intersection exists or if the process of the fifth step V5 is completed, the processing advances to the sixth step V6. It is judged whether or not there exists any new nodes within a subdivision. If a new node exists, the processing advances to the seventh step V7 in which an arc is formed from the new node to all of the existing nodes contiguous to the subdivision in a road connecting process 3 as shown in FIG. 19D. If no new node exists, the processing advances to the eighth step V8 in which a road connecting process 4 takes place for roads which is not subjected to any of the foregoing connecting processes. Specifically, the route generating section 14 calculates, as shown in FIG. 19E, two intersections between a new arc and the border of the subdivision. The midpoint of the intersections is introduced into the list as a new node. An arc is formed from the midpoint to all the existing nodes contiguous to the subdivision. The relationship of nodes within the subdivision is updated at the ninth step V9. The list is also updated according to this updated relationship. As a result, all of new nodes and arcs are connected to the existing nodes and arcs. If it is judged at the tenth step V10 that all subdivisions have not yet been subjected to the process, the processing returns to the first step V1 and then the processes of the second through ninth steps V2–V9 are repeated for the next subdivision. An obstruction map of FIG. 20 is finally obtained.

The route evaluating section 15 evaluates the traveling routes on the basis of the arc length $r$ and the degree of traveling difficulty $s$. The arcs regarding roads and bridges are given predetermined degrees of traveling difficulty $s$ which is previously set in an extent between 0–1 according to a relative evaluation to the existing arcs. The determination of the degrees takes into account attribute data of road data, such as road width and paved/unpaved, and attribute data of bridge data, such as bridge width and load limitation. The easiest traveling takes 0 (zero) as the degree of traveling difficulty $s$. As the difficulty increases, the degree approaches 1 (one). The individual existing node has the degree of $s=1$.

The route evaluating section 15 subsequently determines all combinations of arcs satisfying a traveling route from the current position to the destination. The nodes of the respective traveling routes are listed. A product of the arc length $r$ and the degree of traveling difficulty $s$ is calculated at the respective nodes. The sum of all the products up to the destination is used as an evaluation value $a$. The process is summarized as follows:

$$a=\Sigma(s \cdot r)$$

Figure 21:
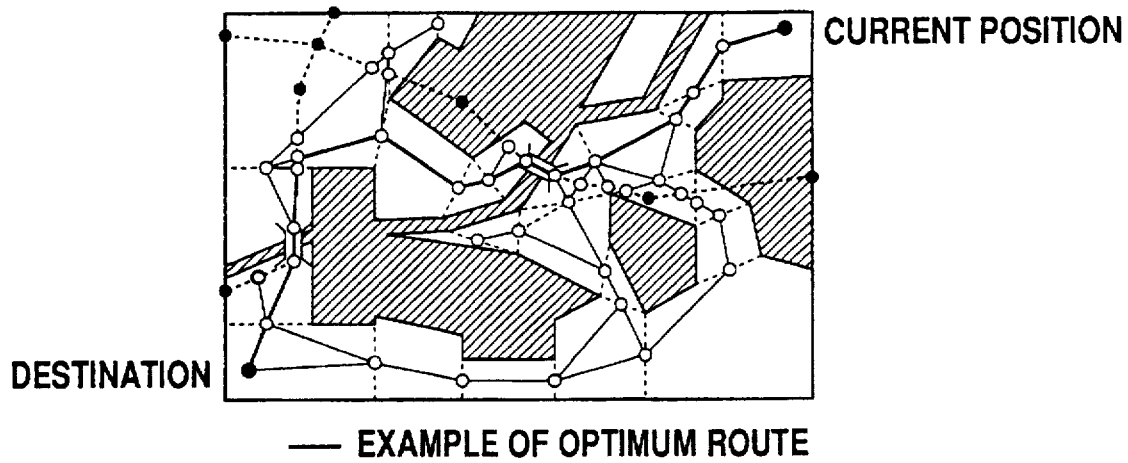
FIG. 21 illustrates the optimum route selected on the basis of the obstruction map.

A traveling route having the least evaluation value $a$ is finally selected as the optimum route. For example, an optimum route is obtained as shown in FIG. 21. According to the third embodiment, it is possible to avoid the inclination obstruction regions and/or the natural obstruction regions in generating an optimum route of the movable object by utilizing roads and bridges while taking account of the degree of traveling difficulty.

Figure 22:
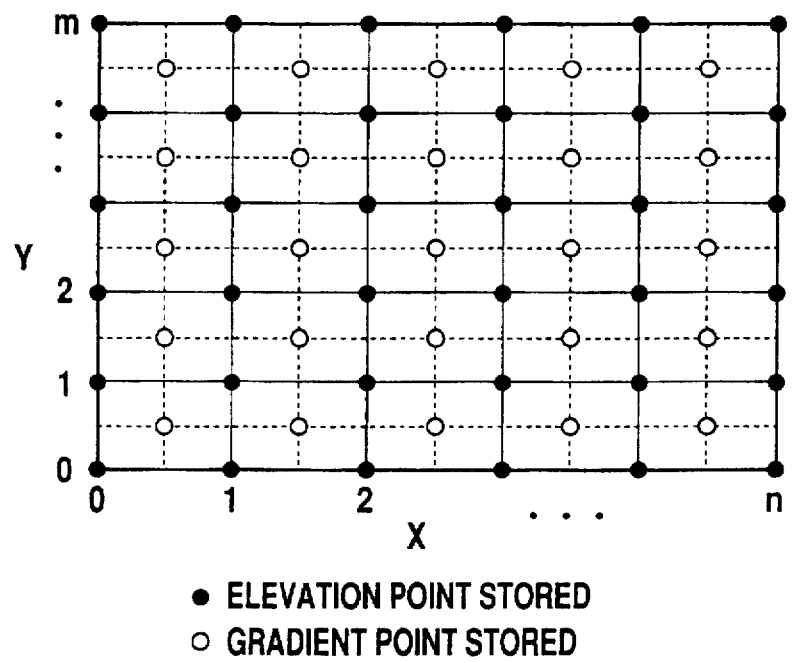
FIG. 22 is a diagram illustrating the process in the gradient map creating section according to a fourth embodiment of the invention.
Figure 23:
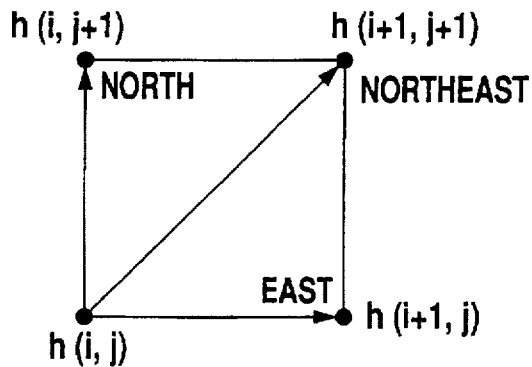
FIG. 23 illustrates positions of subareas in three directions for calculating the gradients.

FIG. 22 schematically shows the process in a gradient map creating section 12 according to a fourth embodiment of the invention. The latticelike subareas indicated by solid lines are identical to those in the first to third embodiments. The fourth embodiment is characterized in that a gradient at the center of a subarea is calculated.

The gradient map creating section 12 loads elevation data $h(i, j)$ of a subject subarea along with elevation data $h(i, j+1)$, $h(i+1, j+1)$, $h(i+1, j)$ of the eastern, northern and northeastern subareas of the subject subarea. Since the elevation data is comprised of the elevation at southwest corner of a subarea, a gradient of the surface of a subarea can be obtained by dividing the elevation difference in three directions by the distance between the regions. The obtained gradient is, as is apparent from FIG. 3, supposed to be located in the center of the subareas. In other words, the lattice is shifted northeast by ½ of the distance between the regions. According to this process, since the calculation of gradients is operated only in three directions, it is possible to improve the rate of calculating process. Further, since the gradient at the center of the subarea is employed, it is possible to reduce the influence of discretization.

Figure 24:
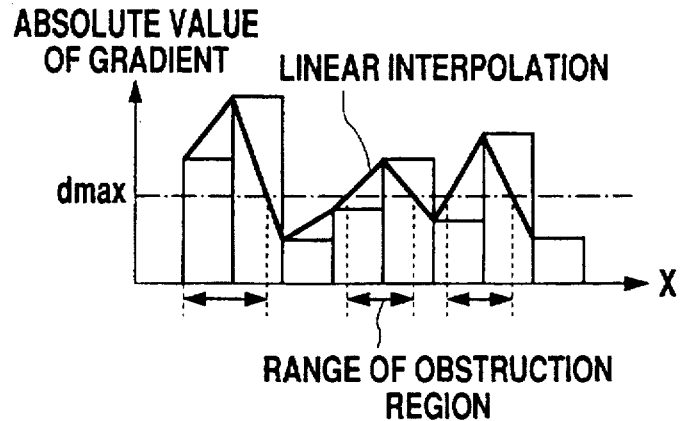
FIG. 24 is a diagram illustrating the process in the obstruction region extracting section according to a fifth embodiment of the invention.
Figure 25:
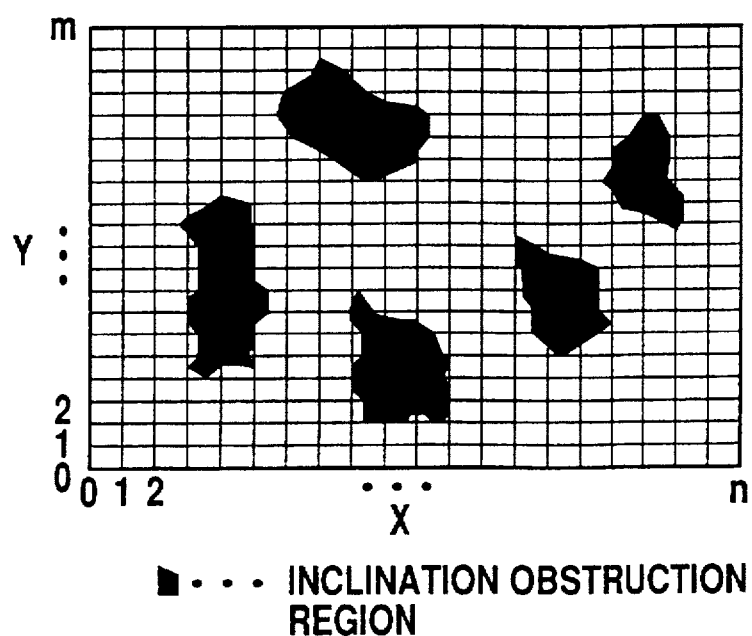
FIG. 25 illustrates an obstruction map obtained in the obstruction region extracting section.

FIG. 24 schematically shows the process in an obstruction region extracting section 13 according to a fifth embodiment of the invention. The fifth embodiment is characterized in that the obstruction region extracting section 13 interpolates the gradients of adjacent subareas in terms of a straight line. A subarea is extracted as the inclination obstruction region to have the value obtained from the interpolation equal to or over the maximum movable gradient (dmax). As a result, a continuous inclination obstruction region with a high accuracy can be obtained as shown in FIG. 25.

The route evaluating section 15 of the sixth embodiment evaluates, in addition to the arc length $r$, the degree of traveling difficulty, such as a fall, a tumble and inability in movement of a movable object, in terms of arc gradient $\Delta$.

When respective nodes are passed after starting off the current position, the calculation according to the following equations is made to find the arc length $r$ and the arc gradient $\Delta$ of the arc just passed through.

$$r = \sqrt{(x-x0)^2 + (y-y0)^2 + (h-h0)^2}$$

$$\Delta = (h-h0)/\sqrt{(x-x0)^2 + (y-y0)^2}$$

where (x, y, h) represents the coordinate of the current node in order in the east and west direction, the north and south direction and the elevation, and (x0, y0, h0) represents the coordinate of the previous node in order in the east and west direction, the north and south direction and the elevation. A weighting constant $w$ $0<w<1$ is introduced in the relationship between the arc length $r$ and the arc gradient $\Delta$. The evaluation value $a$ is calculated for all arcs toward the destination according to the following equation.

$$a=\Sigma\{w \cdot r^2 + (1-w) \cdot \Delta^2\}$$

The enlargement of the weighting constant $w$ leads the increased weight of the arc length $r$. On the contrary, the reduction of the constant $w$ leads the weight of the degree of traveling difficulty. Assuming that a traveling route is selected to have the least evaluation value $a$, the traveling route is shorter and smoother depending upon the weighting.

Figure 26:
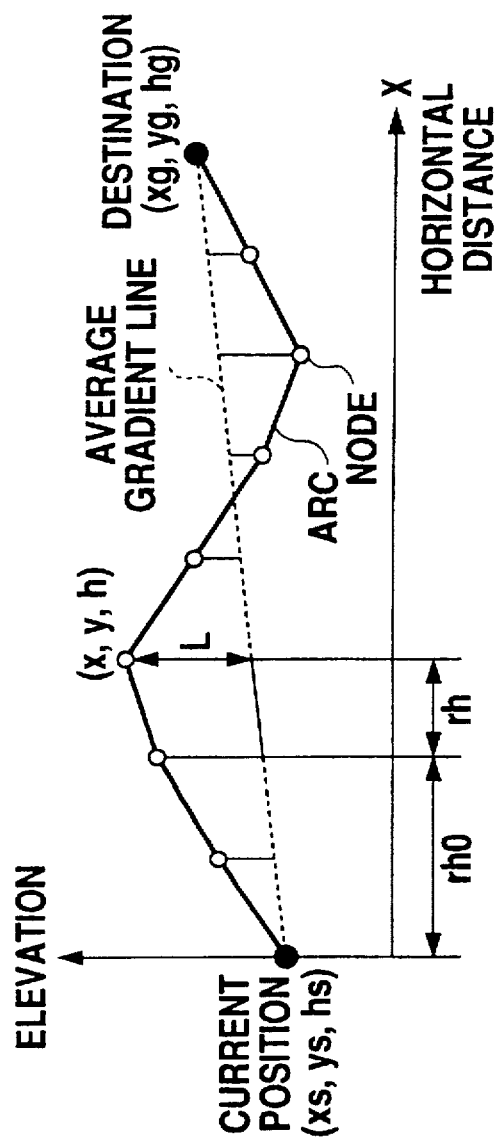
FIG. 26 illustrates the process in the route evaluating section.

FIG. 26 schematically illustrates an elevational section of the traveling route for explaining the process of a route evaluating section 15 of a seventh embodiment of the invention. The horizontal axis represents a horizontal distance. The vertical axis stands for an elevation. The seventh embodiment selects a traveling route having the least vertical variation of nodes in addition to the arc length $r$.

The route evaluating section 15 calculates first an average gradient $\Delta AGS$ between the current position and the destination according to the following equation.

$$\Delta GS = (hg - hs)/\sqrt{(xg-xs)^2 + (yg-ys)^2}$$

The average gradient indicated by a broken line is obtained. Here, (xs, ys, hs) represents the coordinate of the current position, and (xg, yg, hg) represents the coordinate of the destination.

Elevation differences $L$ between a node and the average gradient are calculated for arcs divided by blank nodes in all combinations of arcs according to the following equation.

$$L = h - \Delta GS \cdot (rh + rh0)$$

where $rh$ represents a horizontal distance between the current node and the previous node, and $rh0$ represents a horizontal distance between the current position and the previous node. $rh0$ is calculated according to the following equation.

rh0←rh+rh0

A weighting constant $\underline{w}$ is finally introduced between the arc length $\underline{r}$ and the elevation difference $\underline{L}$. Evaluation values a for all possible traveling routes are calculated according to the following equation.

$$a = \Sigma \{w \cdot r^2 + (1-w) \cdot L^2\}$$

As a result, a shorter route with less ups and downs is selected as an optimum route with the cost effectiveness depending upon the weighting.

An eighth embodiment is characterized in that the arc length $\underline{r}$, the arc gradient $\Delta$ and the elevation difference $\underline{L}$ regarding the average gradient are simultaneously employed as an evaluation index. Assuming that weighting constants for the arc length $\underline{r}$, the arc gradient $\Delta$ and the elevation difference $\underline{L}$ are represented by $\underline{p}$, $\underline{q}$, $\underline{t}$, respectively, an integrated evaluation value $\underline{A}$ is expressed by the following equations.

$$A = \Sigma \{p \cdot r^2 + q \cdot \Delta^2 + t \cdot L^2\}$$

$$p+q+t=1, \; p, q, t \geq 0$$

A traveling route having the least integrated evaluation value $\underline{A}$ is selected as a shorter optimum route with a smooth and cost effective manner depending upon the weighting.

What is claimed is:

1. A route generating device comprising:
   an elevation map memory storing elevation data of subareas which are defined by division of an operations zone of a movable object;
   an input unit reading the elevation data from the elevation map memory;
   a gradient map creating section calculating gradient data based on the elevation data read from the map memory so as to create a gradient map;
   an obstruction region extracting section extracting an inclinational obstruction region on the basis of the gradient map, said inclinational obstruction region having a gradient enough to hinder a movement of the movable object;
   a route generating section determining a travelable region on the basis of the inclinational obstruction region for going around obstructions so as to calculate possible traveling routes on the basis of the travelable region for avoiding the obstructions;
   a route evaluating section evaluating the traveling routes calculated in the route generating section so as to select an optimum route from a current location of the movable object to a destination; and
   an output unit outputting the optimum route selected in the route evaluating section.

2. A route generating device according to claim 1, further comprising a natural obstructions map memory storing position data of a natural obstruction region occupied by a natural obstruction to the movable object, and a region composite section superposing the inclinational obstruction region and the natural obstruction region so as to create a composite obstruction region, said route generating section determining said travelable region on the basis of the composite obstruction region.

3. A route generating device according to claim 2, further comprising an artificial structures map memory storing position d ata of an artificial structure which the movable object can use, wherein said route generating section is capable of superposing said travelable region and said artificial structure so as to calculate the possible traveling route through the artificial structure.

4. A route generating device according to claim 1, wherein said elevation map memory stores a n elevation of a southwestern end of said subarea as said elevation data, said gradient map creating section being capable of calculating a gradient of said subarea to an eastern, a northern and a northeastern subareas.

5. A route generating device according to claim 1, wherein said obstruction region extracting section is capable of interpolating the gradients of adjacent ones of said subareas in terms of a straight line and of extracting as said inclinational obstruction region a subarea which is related to the gradient over a maximum movable gradient.

6. A route generating device according to claim 1, wherein said route evaluating section is capable of calculating an arc length as an index of a shortest traveling route and an arc gradient as an index of a degree of difficulty in a movement, and weighting said arc length and said arc gradient so as to select the optimum route.

7. A route generating device according to claim 1, wherein said route evaluating section is capable of calculating an arc length as an index of a shortest traveling route and a vertical variation between opposite arc ends as an index of ups and downs of the traveling route, and weighting said arc length and said vertical variation so as to select the optimum route.

8. A route generating device according to claim 1, wherein said route evaluating section is capable of calculating an arc length as an index of a shortest traveling route, an arc gradient as an index of a degree of difficulty in a movement and a vertical variation between opposite arc ends as an index of ups and downs of the traveling route, and weighting said arc length, said arc gradient and said vertical variation so as to select the optimum route.

* * * * *